United States Patent [19]
Abiko et al.

[11] 4,389,644
[45] Jun. 21, 1983

[54] ASYNCHRONOUS TYPE MULTICHANNEL SIGNAL PROCESSING SYSTEM

[75] Inventors: Toshio Abiko, Ibaragi; Masayuki Matsuo, Shijonawate, both of Japan

[73] Assignee: Matsushita Electric Works, Ltd., Osaka, Japan

[21] Appl. No.: 226,874

[22] Filed: Jan. 21, 1981

[51] Int. Cl.³ .......................... H04Q 9/12; H04B 1/00

[52] U.S. Cl. .......................... 340/825.52; 340/825.73; 340/825.56

[58] Field of Search ...................... 340/825.58, 825.71, 340/825.52, 825.73, 825.75, 825.76, 825.56; 367/197

[56] References Cited

U.S. PATENT DOCUMENTS

| | | | |
|---|---|---|---|
| 3,551,889 | 12/1970 | Miller | 340/825.75 |
| 3,723,956 | 3/1973 | Carman | 367/197 |
| 3,766,523 | 10/1973 | Brocker et al. | 340/825.75 |
| 4,045,767 | 8/1977 | Nishihara et al. | 340/825.76 |
| 4,047,227 | 9/1977 | Rzeszewski | 340/825.76 |
| 4,084,138 | 4/1978 | Wycoff | 340/825.73 |
| 4,121,198 | 10/1978 | Tsuboi | 340/825.75 |
| 4,127,846 | 11/1978 | Mori et al. | 340/825.75 |
| 4,231,019 | 10/1980 | Junginger et al. | 340/825.76 |

*Primary Examiner*—Donald J. Yusko
*Attorney, Agent, or Firm*—Birch, Stewart, Kolasch & Birch

[57] ABSTRACT

An asynchronous multichannel signal processing system comprises a transmitter and a receiver. A transmitter is adapted to transmit a signal converted from data being transmitted including address data and control data such that one information unit comprises a plurality of units each including one frequency signal. The receiver is adapted to reproduce the received data by discriminating the frequency component included in the received signal. At that time, a plurality of readings of received data are reproduced in one unit time period of the transmitted signal. If and when the address data included in at least one of the plurality of readings of received data coincides with its own address data of the receiver, the control data is extracted from the received data including the coincided address data.

16 Claims, 24 Drawing Figures

FIG.2A S1 (1d)
FIG.2B S2 (1e)
FIG.2C S3 (1f)
FIG.2D S4 (1g)
FIG.2E S5 (1h)
FIG.2F S6 (1i)
FIG.2G S7 (1j)
FIG.2H S8 (1k)
FIG.2I SIGNAL
f1
f2
f3
f4
f2
f4
f1
f2

DISPLAY
DISPLAY
MN1450
OSC
BUFFER AMP
QUENCHING OSC
LPF
FRONT END
LF AMP
BPF (f1)
BPF (f2)
BPF (f3)
BPF (f4)
LEVEL DET
LEVEL DET
LEVEL DET
LEVEL DET
STROBE
JAM
BINARY CODE

CONTROL DATA
ADDRESS DATA
S7 S8 S1 S2 S3 S4 S5 S6 S7 S8 S1 S2 S3 S4
VACANT UNIT
f1 f2 f3 f4
TA
TB
TA=13.7314 msec
TB=14.011msec
SCAN-I
SCAN-II
SCAN-III
AI3
AI2
AI1
AI0
VU

FIG.6 RAM

| Y \ X | 0 | 1 | 2 | 3 |
|---|---|---|---|---|
| 0 | REGISTER 1 | | | S2 |
| 1 | REGISTER 2 | SELF-ADDRESS DATA | | S3 |
| 2 | REGISTER 3 | | | S4 |
| 3 | | | | S5 |
| 4 | | | | OUTPUT REGISTER |
| 5 | | | J1 J2 | OUTPUT COUNTER 1 |
| 6 | 0 0 1 0 | 0 0 0 0 | 0 0 0 1 | OUTPUT COUNTER 2 |
| 7 | RESULT | RESULT | RESULT | ZF OS ST |
| 8 | | | | |
| 9 | | | | S2 |
| A | | | | S3 |
| B | SCAN - I | SCAN - II | SCAN - III | S4 |
| C | | | | S5 |
| D | | | | |
| E | | | | 0 0 0 0 |
| F | | | | 0 0 0 0 |

ASYNCHRONOUS TYPE MULTICHANNEL SIGNAL PROCESSING SYSTEM

BACKGROUND OF THE INVENTION

1. Field of the Invention

The present invention relates to an asynchronous type multichannel signal processing system. More specifically, the present invention relates to such multichannel signal processing system including a transmitter and a receiver, wherein transmission data converted into a combination of frequency signals is transmitted from the transmitter and the received data is reproduced by discriminating such frequency signals.

2. Description of the Prior Art

Various types of multichannel signal processing systems have been conventionally proposed and put into practical use. Such a system of interest to the present invention is adapted such that transmission data is converted into a combination of a plurality of frequency signals and is transmitted and such combination of the frequency signals is discriminated on the part of a receiver, whereby received data is reproduced and an output is obtained in a designated output channel based on the control data included in the received data and a designated output processing operation is performed. By properly changing such combination of the frequency signals, the transmission data can be changed and accordingly a number of output channels can be controlled or a number of kinds of output processing operations can be performed.

With such conventional multichannel signal processing system, it is difficult to make transmission synchronization in a transmitter and reception synchronization in a receiver completely consistent with each other and accordingly it could happen that the received data is incorrectly reproduced in association with such deviation of timing. As a result, the address data and the control data included in the reproduced received data became erroneous, thus causing a malfunction. If such multichannel signal processing system is employed in a remote control system, for example, such malfunctions need be reduced as much as possible. The reason is that such malfunctions could cause a serious accident.

SUMMARY OF THE INVENTION

The inventive asynchronous multichannel signal processing system comprises a transmitter and a receiver. The transmitter is adapted to transmit transmission data converted such that one information unit is comprised of a plurality of units each including one frequency signal and the receiver is adapted to detect the frequency component included in the received signal to reproduce the received data. The receiver reads the received signal a plurality of times corresponding to one time unit of the transmitter and accordingly reproduces the received data. In the case where the transmission data includes the address data, if and when at least one of the sections of address data included in the plurality of reproduced received data coincides with the inherent address data of the receiver, the receiver receiving the said address data determines that the said receiver is designated or addressed. In the case where the transmission data does not include the address data, if and when at least two received data among the plurality of reproduced received data coincide with each other, the received data as coincided with each other are determined as the proper data at that time.

According to the present invention, the received data is detected a plurality of times on the part of the receiver corresponding to the time period of one unit of the transmitted signal and, therefore, as compared with the conventional one there is little possibility of an unreceivable state due to deviation of synchronization between the transmitter and receiver or of reproducing erroneous received data. In addition, erroneous received data due to an external noise is prevented from being reproduced and the receiver is effectively prevented from making malfunctions.

In a preferred embodiment of the present invention, in order to greatly reduce the possibility of causing a malfunction, a time period of no signal, i.e. a vacant unit is provided in each information unit being transmitted from the transmitter. By setting such vacant unit between the information units, malfunction on the part of the receiver caused by continuation between the preceding information and the succeeding information is substantially eliminated. Accordingly, the embodiment is particularly effective in a case where information is simultaneously transmitted from a plurality of transmitters. Since it is not necessary to take into consideration malfunction caused by overlapping or continuity of the information signals, the number of receivers or the output channels being controllable can be considerably increased.

In another preferred embodiment of the present invention, the unit time period (unit) in the receiver is selected to be slightly longer than that in the transmitter, whereby even if a unit switching period of the transmitter and/or the receiver is changed in terms of the time, always the correct received data can be reproduced, inasmuch as the unit switching period in the receiver does not become shorter than that in the transmitter.

In a further preferred embodiment of the present invention, the output is forcibly held for more than a predetermined time period in the case where the received data has been continually reproduced and therefore the output is held even in the case where the signal is masked due to a noise or any other influence, i.e. the received data has not been reproduced during that time period, and as a result a more stabilized control can be performed.

Accordingly, a principal object of the present invention is to provide an asynchronous multichannel signal processing system, wherein a possibility of malfunction or misdetermination is considerably reduced.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a view showing one example of storing regions in the random access memory.

DESCRIPTION OF THE PREFERRED EMBODIMENTS

Figure 1:
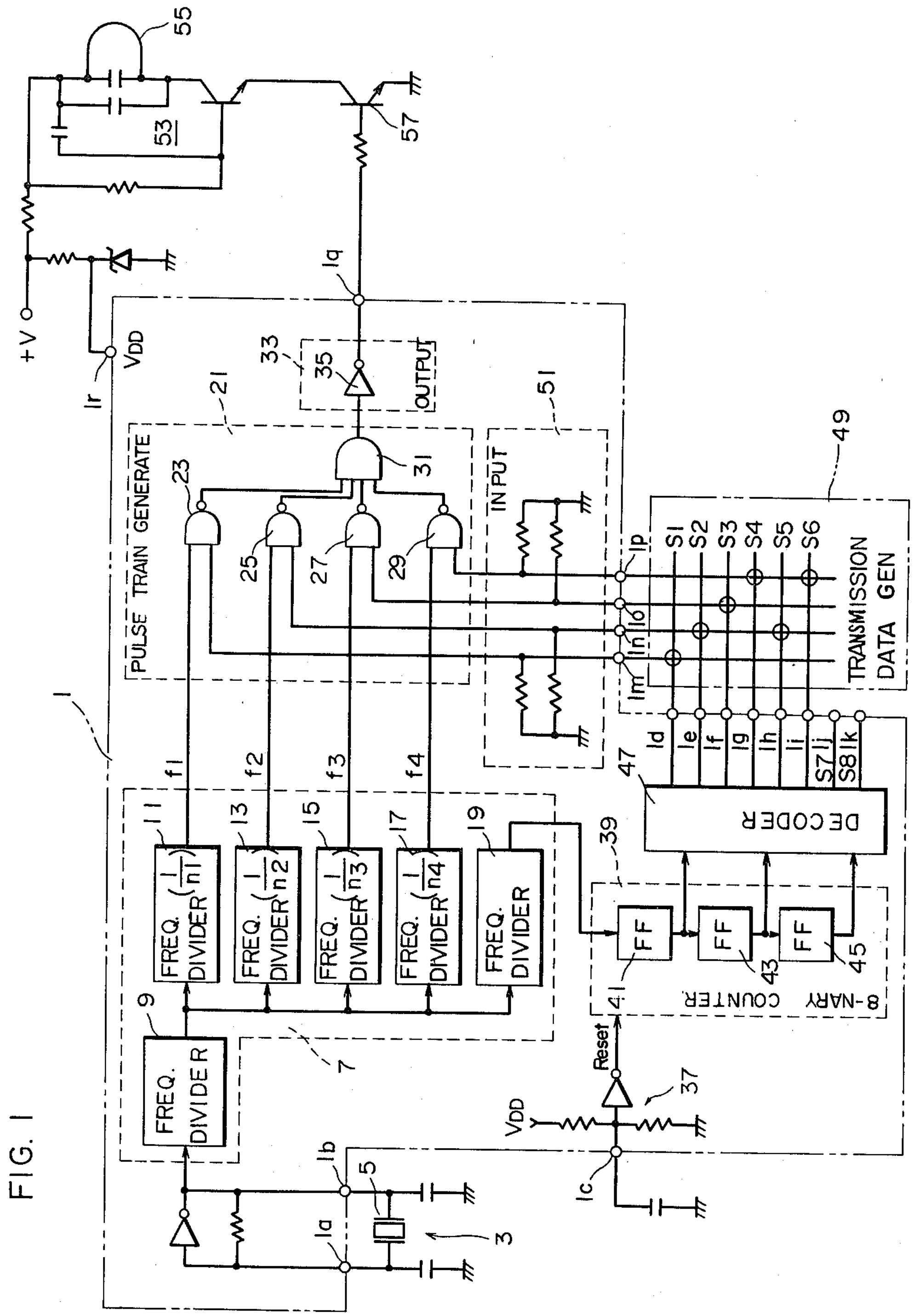
FIG. 1 is a block diagram showing a preferred embodiment of a transmitter for use in the present invention.

FIG. 1 is a block diagram showing a preferred embodiment of a transmitter for use in the present invention. The transmitter shown comprises a large scale integration 1 implemented by complementary MOS elements, for example. The large scale integration 1 is connected to receive the output of a crystal controlled oscillator 3 through external terminals 1*a* and 1*b*. The crystal controlled oscillator 3 comprises a quartz oscillator 5 having a resonance frequency of 3.58 MHz and functions as a fundamental oscillator. The fundamental frequency signal obtained from the reference oscillator 3 provided through the external terminals 1*a* and 1*b* is applied to a frequency divider circuit 7. The frequency divider circuit 7 comprises a prescaler 9 which has a frequency division ratio of ⅛. The output of the prescaler 9 is applied to five frequency dividers 11, 13, 15, 17 and 19. The frequency dividers 11, 13, 15 and 17 have the frequency division ratios 1/n1, 1/n2, 1/n3 and 1/n4, respectively, and the outputs from these frequency dividers are applied to a pulse train generating circuit 21 as frequency signals having the frequencies f1, f2, f3 and f4, respectively. The frequency divider 19 included in the circuit 7 has a frequency division ratio of 1/48, for example, and provides a signal having the frequency of 9.32 kHz. Meanwhile, at least the frequency divider 19 out of those frequency dividers included in the frequency dividing circuit 7 is preferably adapted such that the duty cycle of the output therefrom is 1:1. In other words, the frequency division ratio of the frequency divider 19 is preferably selected to be an integer multiple of 2.

The pulse train generating circuit 21 comprises four NAND gates 23, 25, 27 and 29 corresponding to the frequency signals f1, f2, f3 and f4, respectively. More specifically, one input of each of the NAND gates 23, 25, 27 and 29 is connected to receive the corresponding one of the frequency signals f1, f2, f3 and f4, respectively, and the other input of each of the NAND gates 23, 25, 27 and 29 is connected to receive the output from a transmission data generating circuit 49 through an input circuit 51. The outputs of these NAND gates 23, 25, 27 and 29 are applied to a buffer amplifier 35 constituting an output circuit 33 and controlling transmission through an AND gate 31.

A reset circuit 37 is connected to an external terminal 1*c* of the large scale integration 1. The reset circuit 37 comprises a capacitor externally connected. The output of the reset circuit 37, i.e. a reset signal, is applied to a 8 bit binary counter or 8-nary counter 39 connected to receive the output of the frequency divider 9. The 8-nary counter 39 has three flip-flops 41, 43 and 45 connected in a cascade fashion and the outputs of these flip-flops 41, 43 and 45 are applied to a decoder 47 as inputs thereto. The decoder 47 receives the output of the 8-nary counter 39 to decode the output of the counter to provide eight discrete outputs in succession to the external terminals 1*d* to 1*k* of the large scale integration 1. Six external terminals 1*d* to 1*i* out of these eight external terminals 1*d* to 1*k* are connected to the transmission data generating circuit 49.

The transmission data generating circuit 49 is implemented by a matrix circuit including six row lines and four column lines and the six row lines are connected to the corresponding external terminals 1*d* to 1*i*, respectively. Accordingly, the respective row lines of the matrix circuit 49 are supplied with the signals S1 to S6 (to be described subsequently) from the decoder 47. The four column lines intersecting these six row lines are connected to the external terminals 1*m* to 1*p*, respectively, of the large scale integration 1. The input signals obtained from these external terminals 1*m* to 1*p* are applied to the pulse train generating circuit 21 through the input circuit 51. More specifically, the inputs from the external terminals 1*m*, 1*n*, 1*o* and 1*p* are the other inputs of the respective NAND gates 23, 25, 27 and 29, respectively. Accordingly, the frequency signals f1, f2, f3 and f4 are obtained from these NAND gates 23, 25, 27 and 29, respectively, responsive to the outputs obtained at the corresponding column lines of the transmission data generating circuit 49. The output of the pulse train generating circuit 21 is connected to the external terminal 1*q* of the large scale integration 1 through the output circuit 33.

Meanwhile, in the embodiment shown the transmission data comprises address data and control data. The address data serves as data for designating a receiver (to be described subsequently). The control data serves as data for designating the output channel or the output manner in the receiver being designated. In the embodiment shown the four row lines (connected to the external terminals 1*e*, 1*f*, 1*g* and 1*h*) of the transmission data generating circuit 49 are used for setting the address data, while the remaining two row lines (connected to the external terminals 1*d* and 1*i*) are used for setting the control data.

The external terminal 1*q* is connected to a modulator 57. The modulator 57 is connected in series with a carrier oscillator 53 and modulates the carrier signal with the output from the external terminal 1*q*, i.e. the frequency signal obtained from the pulse train generating circuit 21. The carrier oscillator 53 comprises an oscillation inductor 55 which functions as a transmitting antenna.

Now referring to FIGS. 2A to 2I, an operation of the transmitter will be described. When a voltage source +V is turned on, the voltage $V_{DD}$ is applied through the external terminal 1*r* of the large scale integration 1. A capacitor connected to the external terminal 1*c* is charged as a function of the voltage $V_{DD}$. When the charged voltage of the capacitor reaches a predetermined value, a reset signal is obtained from the reset circuit 37 to reset the 8-nary counter 39. The 8-nary counter 39 is responsive to the output (of say 9.32 kHz) obtained from the frequency divider 19 to increase the value in succession like "000", "001", "010", . . . "111". Accordingly, the eight outputs from the decoder 47, i.e. the outputs from the external terminals 1*d* to 1*k*, provide in succession and individually the outputs as shown in FIGS. 2A to 2H, respectively. Since the external terminals 1*d* to 1*i* are connected to the row lines of the transmission data generating circuit 49, these row lines are supplied in succession with these signals S1 to S6, respectively. The transmission data generating circuit 49 is adapted such that a matrix arrangement as shown in FIG. 1 is formed with connections at the intersections between the six row lines and the four column lines, as shown. Accordingly, the external terminal 1*m* of the large scale integration 1 is supplied with the signal S1, the external terminal 1*n* is supplied with the signals S2 and S5, the external terminal 1*o* is supplied with the signal S3, and the external terminal 1*p* is supplied with the period signals S4 and S6. Accordingly, the other input of the NAND gate 23 receives the signal S1, the other input of the NAND gate 25 receives the signals S2 and S5, the other input of the NAND gate 27 receives the signal S3, and the other input of the NAND gate 29 receives the signals S4 and S6. In the embodiment shown, the two external terminals 1*j* and 1*k* receiving the output of the decoder 47 are not connected to the matrix circuit 49 for the purpose of setting a vacant unit for each piece of information. Accordingly, the signals S1 to S6 constitute one information unit, while the signals S7 and S8 form a vacant time period (unit).

Figure 2:
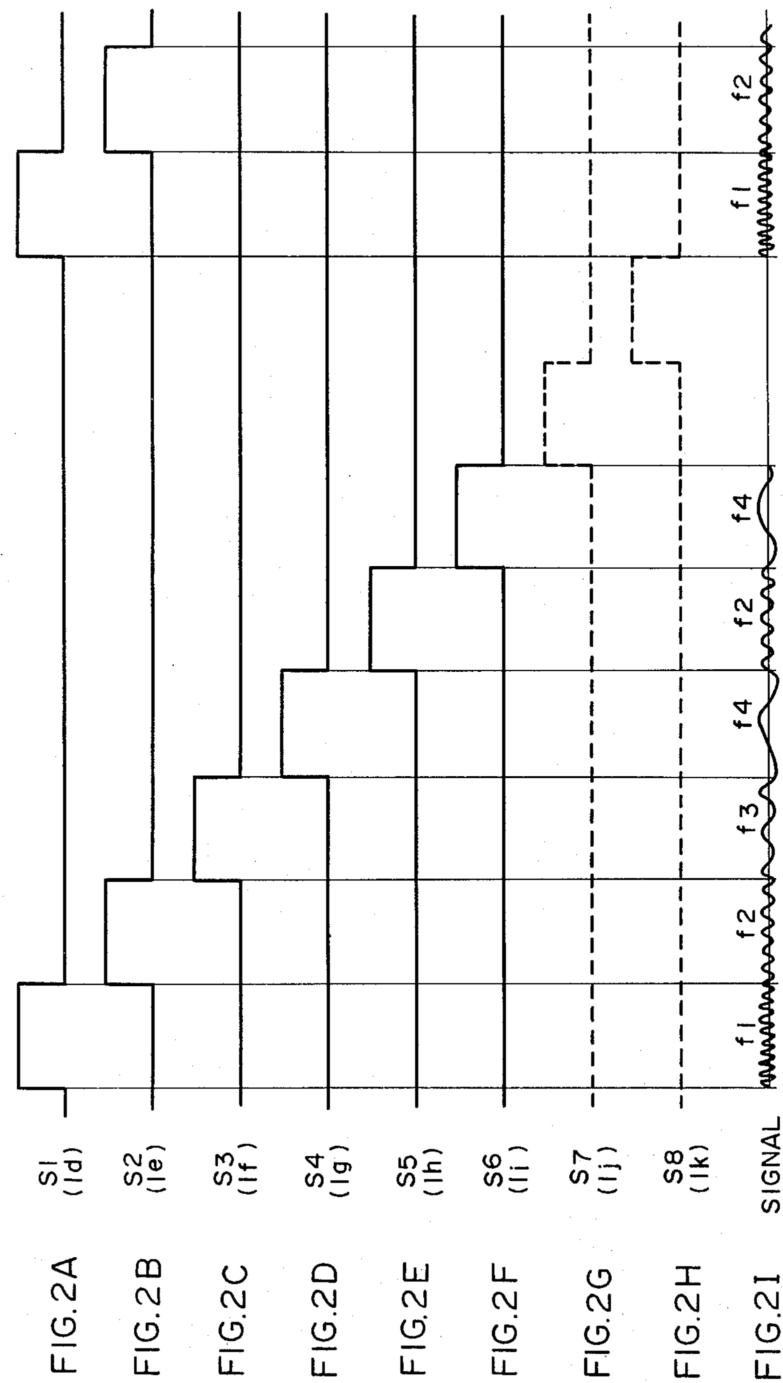
FIGS. 2A to 2H are timing charts showing the unit time periods (units) S1 to S8 of the transmitter and FIG. 2I is a graph showing a waveform of one example of the signal.

On the other hand, since one input of each of the NAND gate 23, 25, 27 and 29 is not supplied with each of the frequency signals f1, f2, f3 and f4, respectively, the frequency signals f1, f2, f3, f4, f2 and f4 are withdrawn in succession of the respective unit time periods S1, S2, S3, S4, S5 and S6 from the external terminal 1*q* of the large scale integration 1 (FIG. 2I). A modulating transistor 57 connected in series with the carrier oscillator 53 repeats an ON or OFF state responsive to the frequency signal from the terminal 1*q*. Accordingly, an information signal (not shown) modulated with the frequency signal such as shown in FIG. 2I, is transmitted from the transmitting antenna 55. The periods of the outputs S7 and S8 from the decoder 47 define a signal-absent period, i.e. a vacant unit. A possibility of malfunction in the receiver is reduced as a function of the vacant unit, as to be more fully described subsequently.

Figure 3:
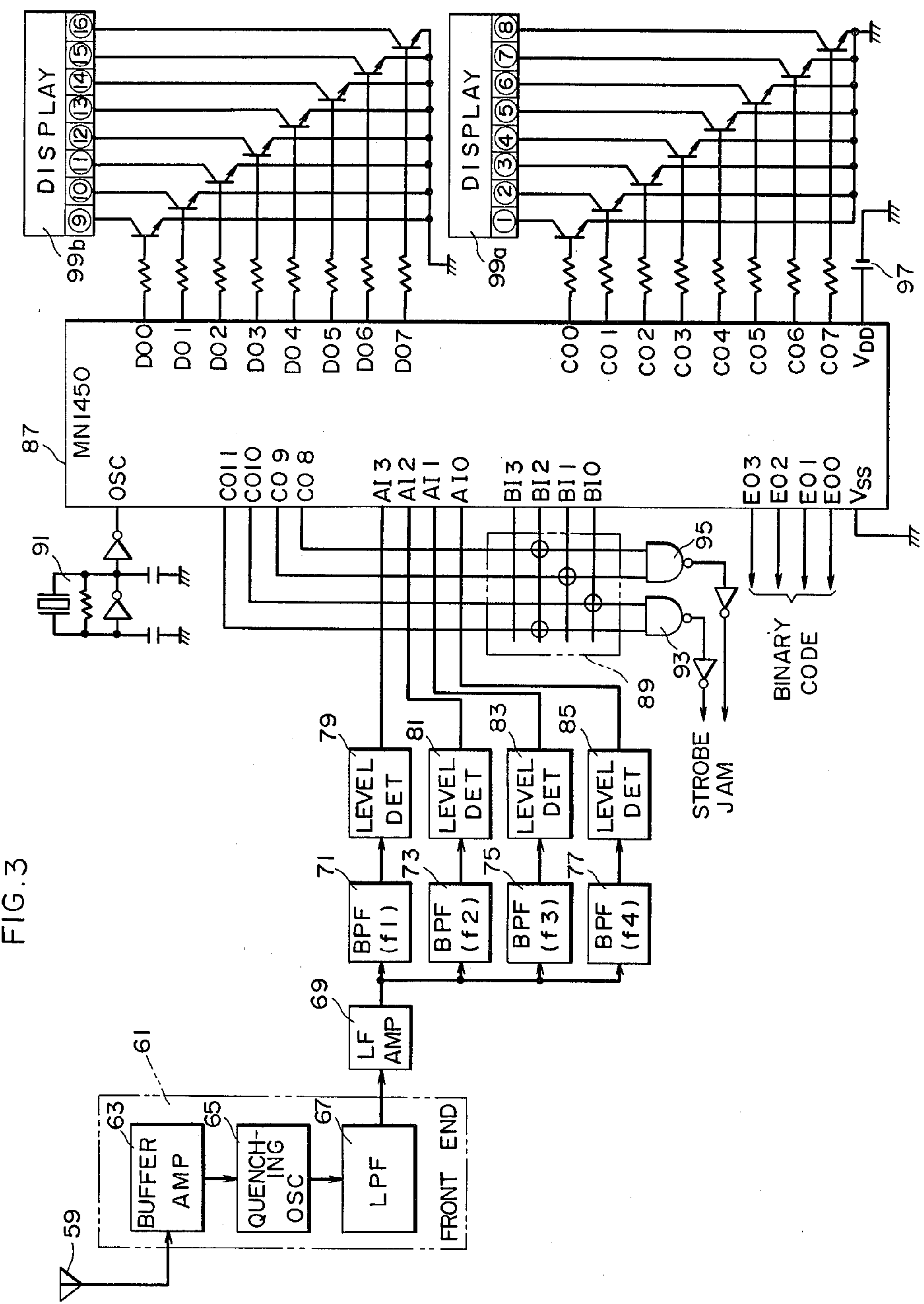
FIG. 3 is a block diagram showing a preferred embodiment of a receiver for use in the present invention.

FIG. 3 is a block diagram showing a preferred embodiment of a receiver for use in the present invention. The information signal transmitted from the transmitting antenna 55 shown in FIG. 1, for example, is received by an antenna 59. The received signal from the antenna 59 is applied to a front end 61 of a superregenerative system. Meanwhile, a system of such a superregenerative system is disclosed in U.S. Pat. No. 3,337,807, issued Aug. 22, 1967 and entitled "Superregenerative Amplifier-Detector". The front end 61 comprises a buffer amplifier 63 for receiving the received signal from the antenna 59. The received signal from the buffer amplifier 63 is applied to a quenching oscillator 65. Accordingly, the quenching oscillator 65 demodulates a frequency signal as shown in FIG. 2I, for example, based on the received information signal. The information signal, i.e. the frequency signal is applied through a low-pass filter 67 to a low frequency amplifier 69. The low frequency amplifier has a relatively high amplification gain and the output therefrom is applied in parallel to four band-pass filters 71, 73, 75 and 77. The band-pass filters 71, 73, 75 and 77 are adapted to pass the frequency signals f1, f2, f3 and f4, respectively. In other words, the frequency signals f1, f2, f3 and f4 included in the output from the low frequency amplifier 69 are extracted from the band-pass filters 71, 73, 75 and 77. The outputs of these band-pass filters 71, 73, 75 and 77 are applied to the corresponding level detectors 79, 81, 83 and 85, respectively. The level detectors 79, 81, 83 and 85 each provide a signal of the high level or the logic one, for example, when the output of the corresponding band-pass filters 71, 73, 75 and 77, i.e. the frequency signal exceeds a predetermined level.

The receiver comprises a microprocessor 87 which may comprise model MN1450 manufactured by Matsushita Electronics Corporation, Japan. The microprocessor or microcomputer 87 comprises two input ports, i.e. AI0 to AI3 and BI0 to BI3. The outputs of the above described level detectors 79, 81, 83 and 85, i.e. the signals indicating that the frequency signals f1, f2, f3 and f4 are detected, are applied to the input ports AI3, AI2, AI1 and AI0. The input ports BI0 to BI3 of the microcomputer 87 are coupled to the self-address setting circuit 89. The self-address setting circuit 89 comprises a matrix circuit, for example, as in the case of the transmission data setting circuit 49 previously shown in conjunction with FIG. 1 and the matrix circuit comprises four row lines and four column lines. The four row lines of the self-address setting matrix 89 are connected to the previously described input ports BI0 to BI3, respectively. The microprocessor 87 comprises three output ports CO0 to CO11, DO0 to DO7 and EO0 to EO3. Four out of the CO ports, i.e. the CO ports CO8 to CO11, are connected to the four column lines of the self-address setting matrix 89. Two out of four column lines, i.e. the output terminals CO10 and CO11, are connected to two inputs of a NAND gate 93, while the remaining two column lines, i.e. the output terminals CO8 and CO9, are connected to two inputs of the other NAND gate 95. The outputs of these NAND gates 93 and 95 are withdrawn as a strobe signal STROBE and a jamming signal JAM, respectively, as to be described subsequently. Meanwhile, the microcomputer 87 is responsive to a clock signal provided from the oscillator 91 to the terminal OSC to be operable. The clock oscillator 91 has a frequency of 455 kHz, for example. The terminal $V_{DD}$ of the microcomputer 87 is connected to the voltage source 97 and the terminal $V_{SS}$ of the microcomputer 87 is connected to the ground.

As to be more fully described subsequently, the microcomputer 87 is responsive to the input signals from the input ports AI0 to AI3 to selectively drive the respective transistors connected to the output ports CO0 to CO7 and DO0 to DO7. Accordingly, the output lamps ① to ⑯ provided in displays 99*a* and 99*b* are selectively driven to emit light responsive to any of the outputs from the output ports CO0 to CO7 and DO0 to DO7.

Figure 4:
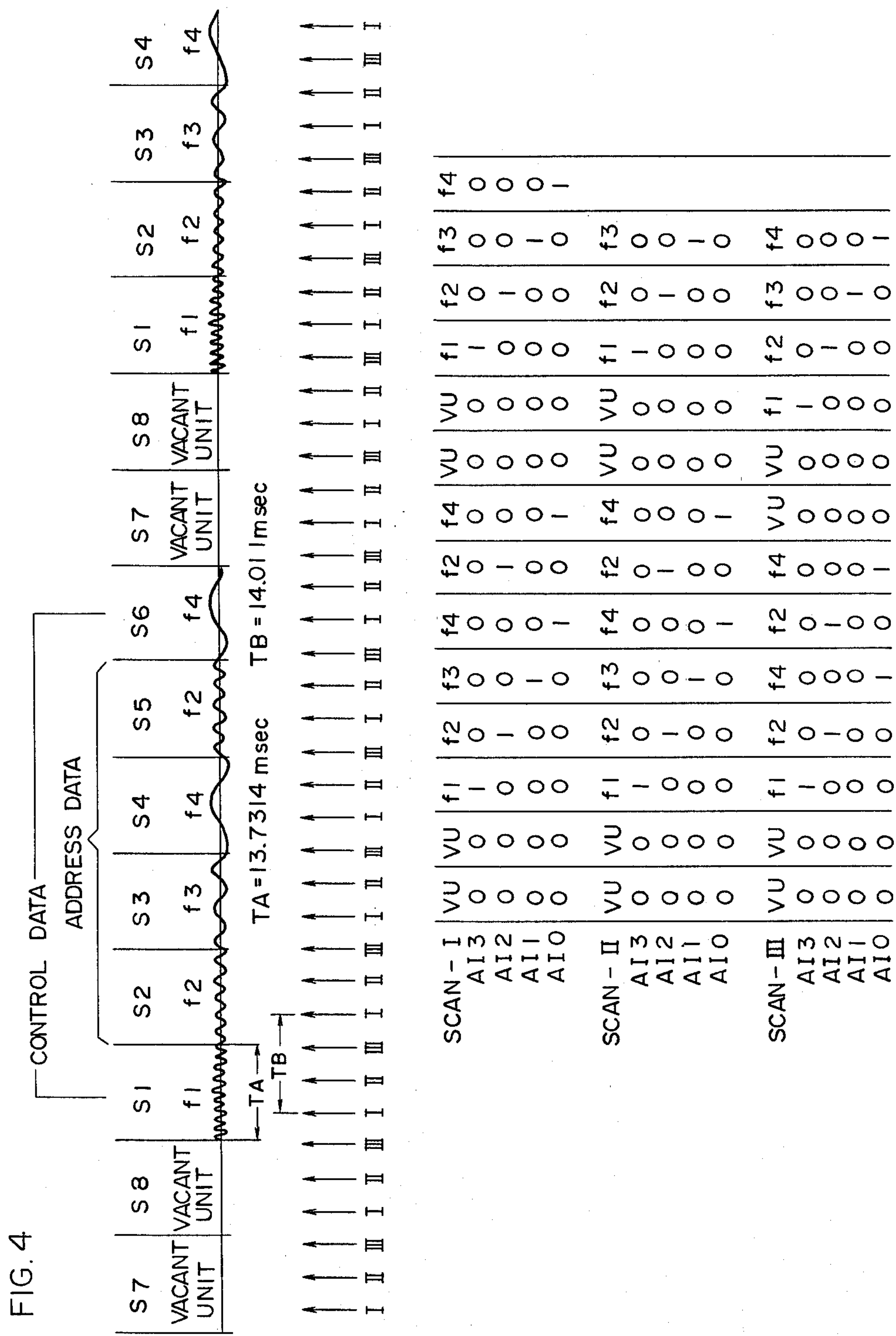
FIG. 4 is a view for explaining the principle of one embodiment of the present invention.

Now referring to FIG. 4, an outline of the operation of the FIG. 3 embodiment will be described. It is difficult to achieve accurate synchronization between the switching timing of the unit in the transmitter shown in FIG. 1, i.e. the periods of the signals S1 to S6 (S8) and the reading timing on the part of the receiver as shown in FIG. 3 and accordingly the inventive system is implemented as an asynchronous system. The frequency signals in a time sequence including a plurality of unit time periods, i.e. S1 to S6 as a single information unit are transmitted from the transmitter, as shown in FIG. 4. The signals to the input ports AI0 to AI3 shown in FIG. 3, for example, are read in m times (in the embodiment shown three times; as denoted as I, II and III) at the time periods corresponding to the respective units, i.e. the unit time periods S1 to S6 on the part of the receiver. If and when at least one out of the address data included in the m pieces of the received data is reproduced by reading in of the signals m times coincide with the address information set by the self-address setting circuit 89 shown in FIG. 3, then the receiver determines that the same has been called for or designated.

Preferably, in the embodiment shown, if and when the address data included in the received data of n times (where m≧n≧2) out of the m pieces of the received data obtained in association with the scanning of the input signals m times coincide with the self-address, the receiver determines that the same has been called for or designated. Thus, by adapting such that the receiver determines that the same has been called for or designated only if and when the n or more pieces of the signals (address data) out of the m pieces of the received signals coincide with the self-address, malfunction due to erroneous determination can be considerably decreased.

Furthermore, in the embodiment shown, for the purpose of better reduction of the above described malfunction, one or more vacant units, for example the unit time periods S7 and S8 in FIG. 4, is provided for each information unit from the transmitter. By thus providing one or more vacant units having no signal between the information signals being transmitted in the transmitter, erroneous detection or erroneous determination on the part of the receiver caused by continuity between the preceding information and the succeeding information can be eliminated. The provision of a vacant unit in the above described manner is effective in the case where transmission of the information signals from two or more transmitters is carried out simultaneously. Since it is not necessary to take into consideration malfunction caused by the overlapping or continuity of the information signals, it is possible to drastically increase the number of channels being controllable. By adapting such that even the carrier wave itself is not transmitted in the time period of one or more vacant units provided between the information units, an average power being transmitted from the transmitter can be reduced and accordingly a possibility of an adverse influence upon other apparatuses can be decreased as much as possible.

In the embodiment shown the unit switching period, i.e. the unit time period TB in the receiver is selected to be slightly longer as compared with the unit switching period, i.e. the unit time period TA (S1 to S6) in the transmitter. The unit time period TB on the part of the receiver corresponds to the repeating period of the reading timings I, II and III of the signal, for example. On the other hand, the unit time period TA on the part of the transmitter corresponds to the time period of the units S1 to S6 (S8). By thus setting the time period TB to be slightly longer as compared with the time period TA, it will not happen that the signal reading period of the receiver becomes shorter as compared with the unit switching period of the transmitter, even in the case where the unit switching period on the part of the transmitter and the signal reading period on the part of the receiver have changed in a time dependent manner. Therefore, no error will occur in reading the information signals and accordingly data can be read accurately.

When the received signal is detected at the above described three timings I, II and III, the frequency component is detected as shown in the respective SCAN-I, SCAN-II and SCAN-III in the case of the example shown. The received data is applied to the input port AO0 to AO3 of the microprocessor for each of the timings I, II and III. If and when the frequency signal f1 is detected, for example, the logics one, zero, zero and zero are inputted to the input ports AO3, AO2, AO1 and AO0, respectively. Accordingly, the received data reproduced at that time would become "1000". Likewise, if and when the frequency signal f2 is detected, the received data of "0100" is reproduced; if and when the frequency signal f3 is detected, the received data of "0010" is reproduced; and if and when the frequency signal f4 is detected, the reproduced data of "0001" is reproduced. Meanwhile, when the vacant unit is detected, the received data would become "0000".

In the embodiment shown, if and when two pieces of the received data coincide with each other among the three pieces of the received data reproduced in the above described manner, it is determined that the data is that transmitted from the transmitter. Referring to the example shown, the received data obtained at the SCAN-I and the received data obtained at the SCAN-II coincide with each other and the received data obtained at the SCAN-III is different from the others. Accordingly, the receiver determines that the coincided received data is proper received data. Accordingly, in the example shown in FIG. 4, the received data obtained at the SCAN-I and the SCAN-II is identified as normal received data.

Figure 5:
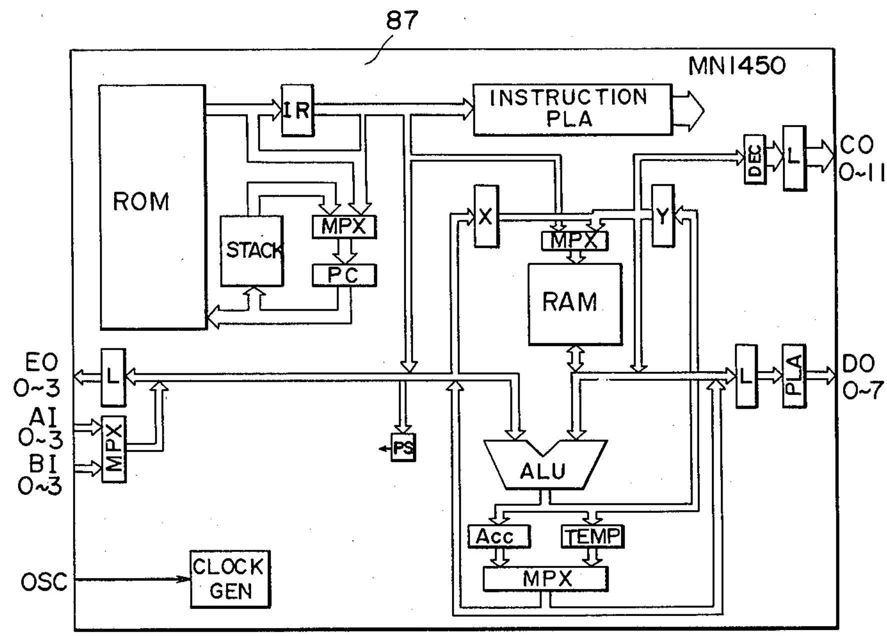
FIG. 5 is a block diagram showing one example of a microprocessor.

Now referring to the flow diagrams shown in FIGS. 7 to 16 as well as the timing chart shown in FIG. 4, an operation of the embodiment will be described in the following. Before entering into a description of the operation of the embodiment shown, a hardware structure of the microcomputer (MN1450) for use in the receiver will be briefly described with reference to FIG. 5. It is pointed out that in FIG. 5 only those portions required for a description of the embodiment are shown while the other portions have been omitted for simplicity. As well known, the microcomputer 87 comprises an arithmetic logic unit ALU, the random access memory RAM and the read only memory ROM. The arithmetic logic unit ALU is a circuit for data processing and determination and has four operation modes, i.e. AND, OR, exclusive OR and ADD. The random access memory RAM is a writeable/readable memory for storing data necessary for controlling the system and is addressed by an X register and a Y register. The read only memory ROM is a memory for storing the program shown in FIGS. 7 to 16 to be described subsequently and is addressed by a program counter PC. An instruction from the read only memory ROM is applied through an instruction register IR to an instruction PLA. The data processed by the arithmetic logic unit ALU is applied to an accumulator Acc. The accumulator Acc comprises a register of four bits, for example. A temporary storing register TEMP is used in storing the content in the accumulator Acc. A clock generator is provided in cooperation with a clock oscillator 91 (FIG. 3) externally provided for generating a fundamental clock for the purpose of operation of the microcomputer 87. The output ports CO0 to CO11, DO0 to DO7 and EO0 to EO3 are each provided with a latch circuit L. A flag PS included in the microcomputer 87 is a flag representing a program status and is used in the embodiment shown to discriminate whether the output "0000", if available, is "0000" representing an output having such value or "0000" representing no output. Meanwhile, the microcomputer 87 is also provided with a reset circuit similar to the reset circuit 37 previously described in conjunction with FIG. 1, although such reset circuit is not shown in FIG. 5.

FIG. 6 is a view showing a format of storing regions in the random access memory RAM. The random access memory RAM comprises four regions being addressed by the previously described X register and sixteen regions being addressed by the previously described Y register. In the following description such storing regions of the random access memory are denoted as RAM (X,Y). For example, the register 1 is denoted as RAM (0,0). The register 1 is used for saving of the data concerning the number of times of signal processing. More specifically, the embodiment shown has been adapted such that the received data is read in three times corresponding to one transmission time period, as previously described in conjunction with FIG. 4. The region REGISTER 1 serves to save the number of processing represented by the X register, i.e. the data of I, II or III. The register II is used for the purpose of saving the read self-address. The register 3 is used for saving the discrimination result of the control data in a binary code. The RAM (1-3,0-3) is used for reading in of the self-address data and for identification of the same. The self-address data is renewed per each cycle of the program. If and when at least two out of three pieces of address information consecutively read out coincide with each other, the said address information is identified as self-address and is adopted. For the purpose of such processing, the read self-address information is stored in a historical sequence in RAM (3,0-3), RAM (2,0-3) and RAM (1,0-3). The self-address data stored in the respective regions is compared with that stored in the other regions. RAM (0-2,8-F) is used for the purpose of signal processing shown in FIG. 4, i.e. for the purpose of storing or processing the received data for each of SCAN-I, SCAN-II and SCAN-III. In the embodiment shown, for the purpose of identifying the read data as the received data in the case where the read data at that time coincides with the data read immediately before, the X address of the respective opponents for comparison is stored in RAM (0,6), RAM (1,6) and RAM (2,6). More specifically, the received data stored in RAM (0,8-F) is compared with the received data stored in RAM (2,8-F). To that end, "2", i.e. "0010" is stored in RAM (0,6). Meanwhile, in RAM (0-2,8-F) the data of Y=8 is cleared each time new received data is received, while the other data is shifted one by one from RAM (X,Y) to RAM (X,Y-1) and the latest received data is stored in Y=F which became vacant as a result of the shifting. Seventeen kinds of discrimination results obtained from the control data identified by SCAN-I, SCAN-II and SCAN-III, i.e. the output channels are stored in a binary code in RAM (0-2,7). However, these respective regions are of four bits and, since sixteen channels can be represented by four bits, "0000" is stored even in the case where nothing is obtained as the discrimination result, i.e. no output channel is designated. Meanwhile, in the case where the data of "0000" is obtained as the output channel, the zero output flag ZF is set. RAM (3,8-F) receives the self-address data processed in the previously described RAM (1-3,0-3) for the purpose of comparison with the address data included in the received data as read in.

OUTPUT COUNTER 1 and OUTPUT COUNTER 2 are used for retaining the output for more than a predetermined time period, as to be described subsequently. OUTPUT REGISTER is used to store binary data being outputted from the output ports EO0 to EO3. The flag OS represents the presence or absence of the output and, if and when the flag OS is set, the output is obtained from the output port and, therefore, even if new other received data is inputted, the same is not outputted. The flag ST is to represent whether the strobe signal has been outputted and, if and when a new output is obtained from the output ports EO0 to EO3, the flag ST is set, whereby the strobe signal STROBE is outputted. The flag ST is set until the output from the EO port comes not to be obtained and the above described strobe signal STROBE is not outputted during a time period when the flag ST has been set. The flags J1 and J2 are to represent whether the received signal is of multiple inputs and, if the multiple inputs are available, first the flag J1 is set and then the flag J2 is set when the multiple inputs are available subsequently and, if and when the flag J2 is set, a jamming signal JAM is outputted. However, even if a state of the multiple inputs continues, the jamming signal JAM is not outputted during a time period when the flag J2 has been set. These flags J1 and J2 are reset in the case where a normal received signal is received or the received signal becomes an available.

Figure 7:
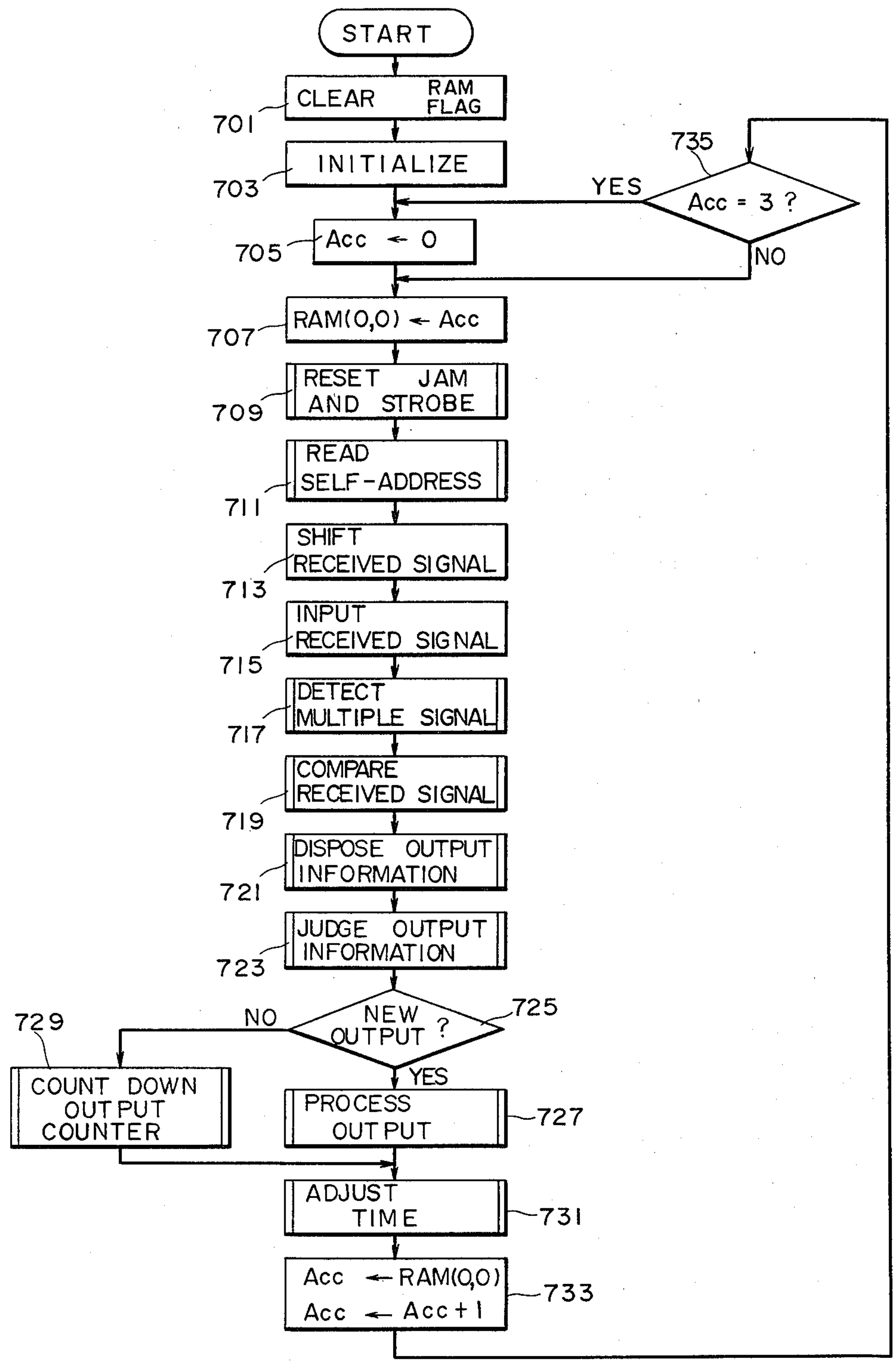
FIGS. 7 to 16 are flow diagrams for explaining the operation of the embodiment shown.
Figure 8:
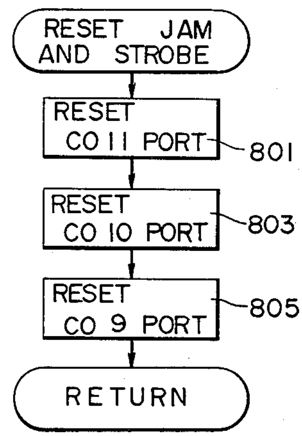
Figure 10:
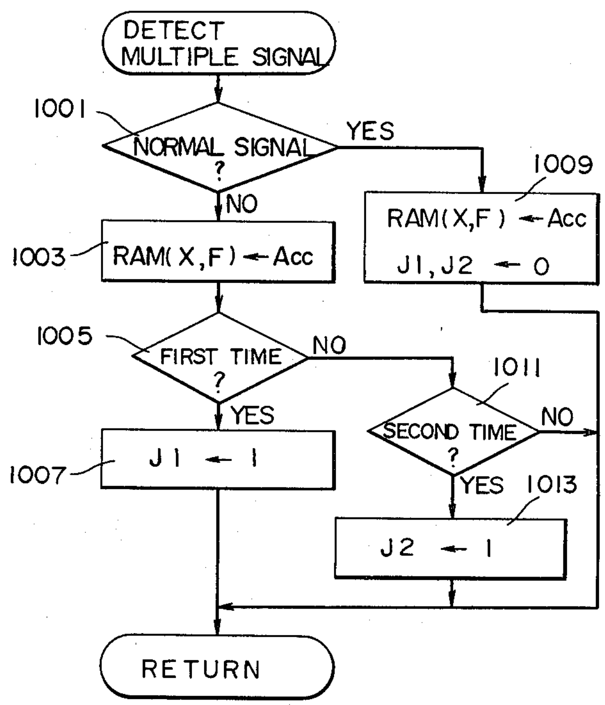
Figure 9:
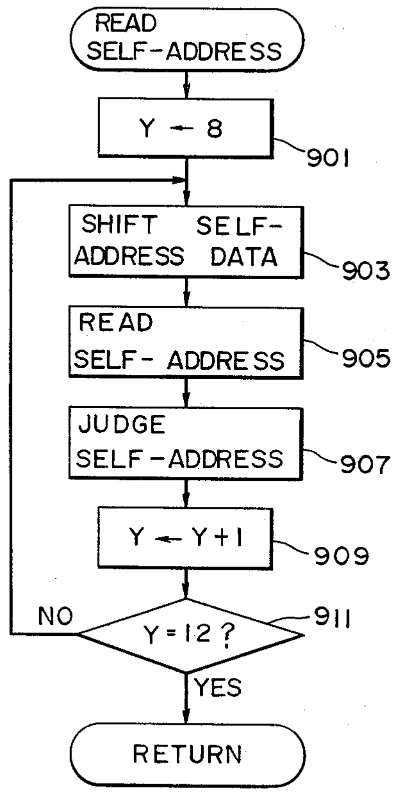
Figure 11:
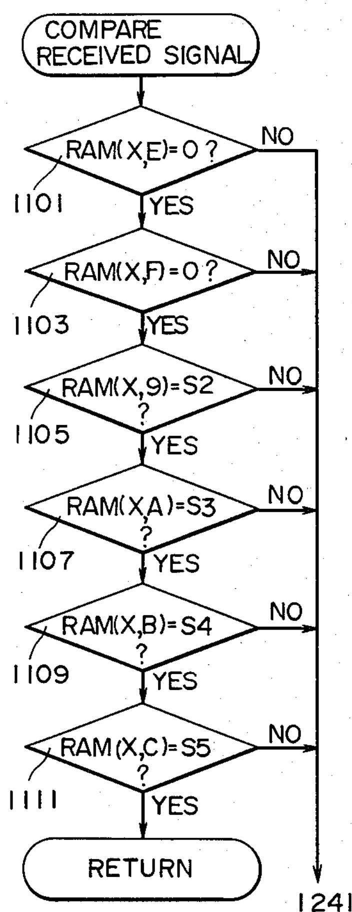

In the following the operation of the above described embodiment will be described in more detail with reference to FIGS. 7 to 16. FIG. 7 shows a main routine and FIGS. 8 to 16 show the respective subroutines. At the step 701 first the random access memory RAM is cleared and the program status flag PS and the latch circuit L of the output port (FIG. 5) are reset. Then at the step 703 the initial setting operation is performed. More specifically, "0010", "0000" and "0001" are stored in RAM (0,6), RAM (1,6) and RAM (2,6), respectively. By thus storing in advance the X address with which comparison is to be made in RAM (0-2,6), it is convenient to call for the data received immediately before. At the step 703 "0000" is stored in RAM (3,VU) and RAM (3,F). This is that which is stored in advance corresponding to the vacant units S7 and S8 in the transmission signal described previously.

At the step 705 zero ("0000") is set in the accumulator Acc. The value of the accumulator Acc at that time is aimed to indicate the value of the X register and accordingly at the beginning the first scanning operation is performed and therefore RAM (0,Y) is designated. At the step 705 and the subsequent step 707 and the steps 733 and 735 the number of times of the scanning operation, i.e. the X address of the random access memory is renewed. As a result the index of the content being read at that time in the random access memory is indicated in the region REGISTER 1, i.e. RAM (0,0).

At the step 709 the jamming signal JAM and the strobe signal STROBE are reset. More specifically, at the step 709 the operation is performed in accordance with the subroutine program shown in FIG. 8. As seen from FIG. 8, the output ports CO9 to CO11 are all reset in this subroutine program. The reason is that since these output ports are also used for the self-address setting circuit 89, as seen from FIG. 3, it is necessary to reset the column lines of the self-address setting circuit 89 before the self-address is read from the input port BI. As a result, a possibility of reading erroneous address data as the self-address is eliminated.

At the step 711 the self-address data is read from the self-address setting circuit 89 (FIG. 3). At the step 711 the operation is performed in accordance with the subroutine program shown in FIG. 9. Since the Y register is used for the purpose of designating the number of the output ports CO, at the first step 901 shown in FIG. 9, "8" is set in the Y register. As a result, the output of the output port CO8 becomes the high level. Although the output port CO8 was not reset in the program previously shown in FIG. 8, the reason is that the same is necessarily reset at the sebsequent step 901. At the step 903 the self-address data stored in the random access memory, i.e. the content of RAM (1-3,0-3) is shifted. This is performed by sequentially increasing the X register. The self-address data stored in RAM (2,0-3) is shifted in RAM (3,0-3) and the data stored in RAM (1,0-3) is shifted in RAM (2,0-3). At the following step 905 the address data from the BI port at that time is stored in RAM (1,0-3). At the following step 907 the self-address data is determined based on the address data as stored. More specifically, in the embodiment shown the three pieces of the address data stored in RAM (1,0-3), RAM (2,0-3) and RAM (3,0-3), respectively, are compared and the address data of at least two of them which coincide with each other are adopted as the self-address data. Assuming that "0100", "0110" and "0100" have been stored in RAM (3,0), RAM (2,0) and RAM (1,0), respectively, for example, then "0100" is identified as the self-address data corresponding to the unit S2. By doing so, not only the system becomes immune to an influence of a noise but also immediate following can be achieved, without necessity of resetting the address data read already each time, even in the case where the self-address setting is changed midway by the user. Then at the following step 909 the Y register is increased. If and when the value of the Y register becomes "12", i.e. after the output ports CO8 to CO11 are in succession brought to the high level so that the address data is loaded each time, the program is caused to return to the main routine.

After the self-address data is thus loaded, the Y register is increased in the computer at the following steps 713 and 715, whereby the corresponding region SCAN-I, SCAN-II or SCAN-III of the random access memory is in succession shifted. At the same time the input data at that time is loaded in the accumulator Acc.

At the following step 717 check is made as to whether the received data loaded in the accumulator Acc at the above described step 715 is a normal one, i.e. a number of inputs are not available simultaneously or a masking by a noise and the like was not available. In the case of abnormal received data, the jamming signal JAM is outputted. More specifically, the operation at the step 717 is performed in accordance with the subroutine program shown in FIG. 10. At the step 1001 shown in FIG. 10 it is determined whether the signal is normal or not. More specifically, as data being considered by way of the input data, there is "0000", "1000", "0100", "0010" or "0001". If and when the data at that time is any one of these pieces of data, it is determined that the same is a normal signal. The reason is that the data that can be inputted by the vacant units and the frequency signals f1, f2, f3 and f4 has only the above described five. In the case where the data other than the above described five is loaded in the accumulator Acc, it is determined that the same is abnormal data. In the case of normal data, at the step 1009 the data loaded in the accumulator Acc is stored in RAM (1,F), RAM (2,F) or RAM (3,F) and the jamming flags J1 and J2 are reset. On the other hand, in the case of abnormal data, at the following step 1003 the data obtained from the accumulator Acc is likewise stored in RAM (X,F). Then at the step 1005 it is determined whether the erroneous data is the first one by referring to the jamming flag J1. More specifically, if and when the data is the first erroneous data, the jamming J1 has not been set yet. Accordingly, if and when the flag J1 has been set, it is determined that the data at that time is the second or further abnormal data, whereas if and when the flag J1 has been reset, it is determined that the data at that time is the first abnormal data. If and when the data at that time is the first abnormal data, then the jamming flag J1 is set at the step 1007. On the other hand, if the data at that time is the second or further abnormal data, then at the following step 1011 the jamming flag J2 is referred to determine whether the data as that time is the second one. More specifically, in the case where erroneous data is inputted two or more times, the jamming flag J2 must have been already set and, unless the flag J2 has been set, the data at that time is the second one, whereas if the flag J2 has been set, it is determined that the data at that time is the third or further one. If and when the second erroneous data is available, then the jamming flag J2 is set at the step 1013.

At the following step 719 the address data included in the received data as reproduced and the self-address data loaded at the step 711 are compared, whereby it is determined whether the receiver has been addressed or called for. More specifically, the operation at the step 719 is executed in accordance with the subroutine program shown in FIG. 11. The self-address data obtained at the previous step 711 and the received data obtained at the steps 713 and 715 are compared. If and when coincidence is attained between both of the address data as a result of comparison, the program proceeds to the following step 721. In the case of noncoincidence, the program proceeds to the subroutine program step 1241 (to be described subsequently) included in the step 721. Meanwhile, S2, S3, S4 and S5 in FIG. 11 denote the self-address data stored in RAM (3,9-C).

At the following step 721, sixteen discrete outputs are discriminated by the control data included in the received data, if and when both coincide with each other as a result of comparison of the address data included in the received data and the self-address data. More specifically, the operation at the step 721 is performed in accordance with the subroutine program shown in FIG. 12. Out of the received data, the unit time periods, i.e. units S1 and S6 are the control data, whereas the remaining units S2 to S5 are the address data, as previously described in conjunction with FIG. 4. Accordingly, at this step sixteen kinds of outputs or output channels are discriminated in accordance with the contents of the units S1 and S6, as shown in Table. The outputs obtained as a result of discrimination are stored in RAM (0-2,7). Meanwhile, the program status flag PS is employed at the steps 1241 and 1243 shown in FIG. 12 in order to discriminate whether "0000" represents an output obtained as a result of discrimination or whether "0000" represents no output available. More specifically, in the case of "0000" as an output, the flag PS is set. Thus the output information is processed.

Figure 13:
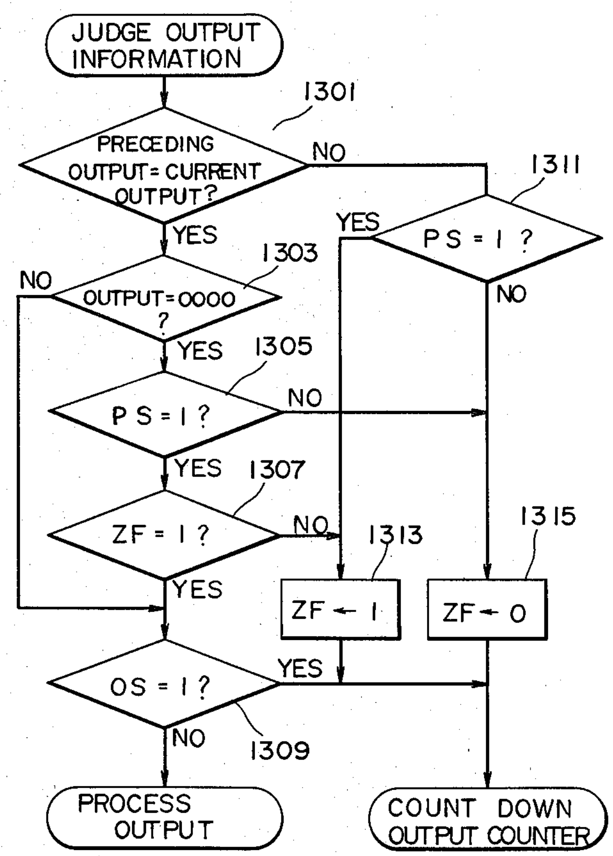
Figure 12:
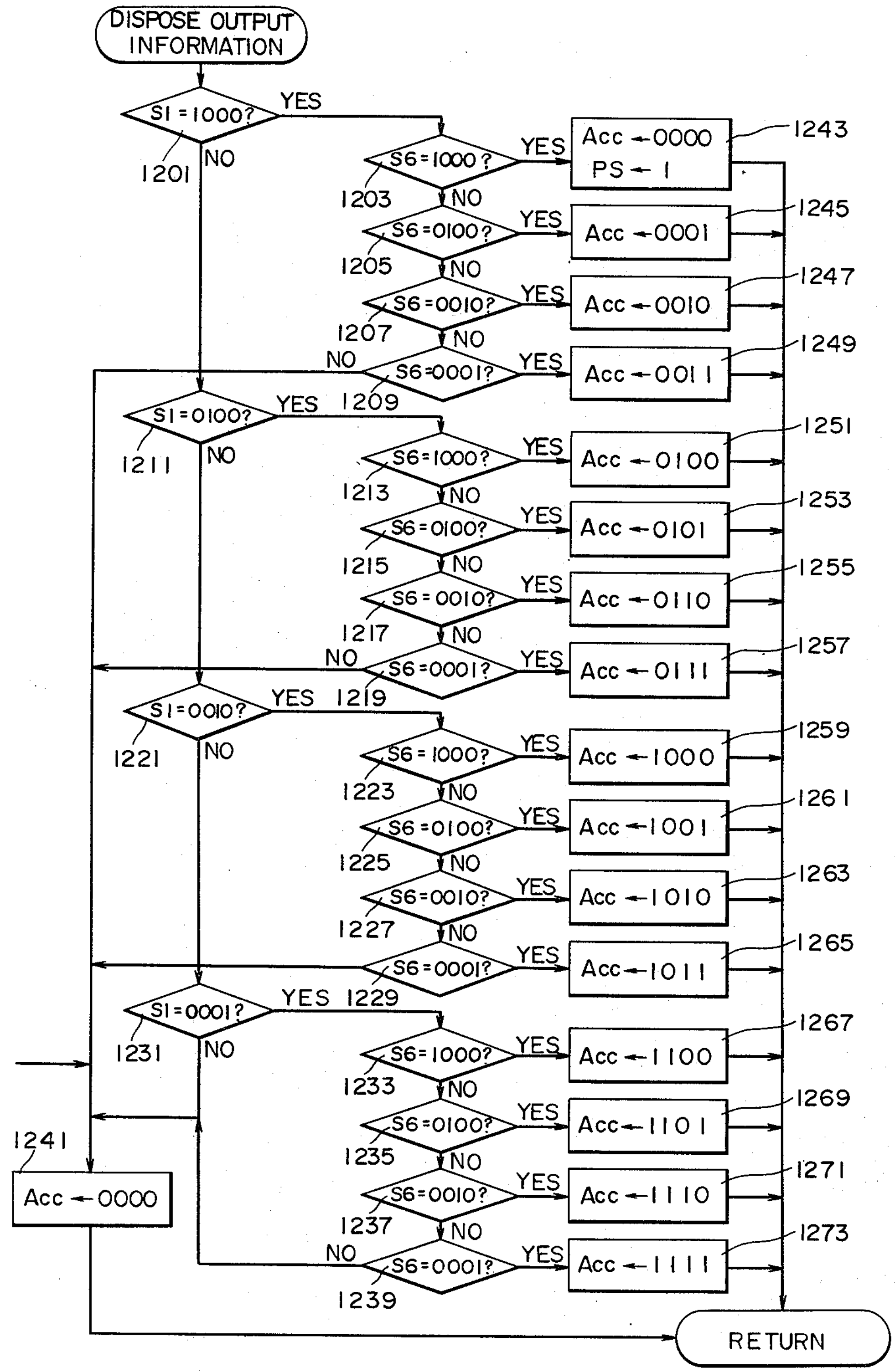
Figure 14:
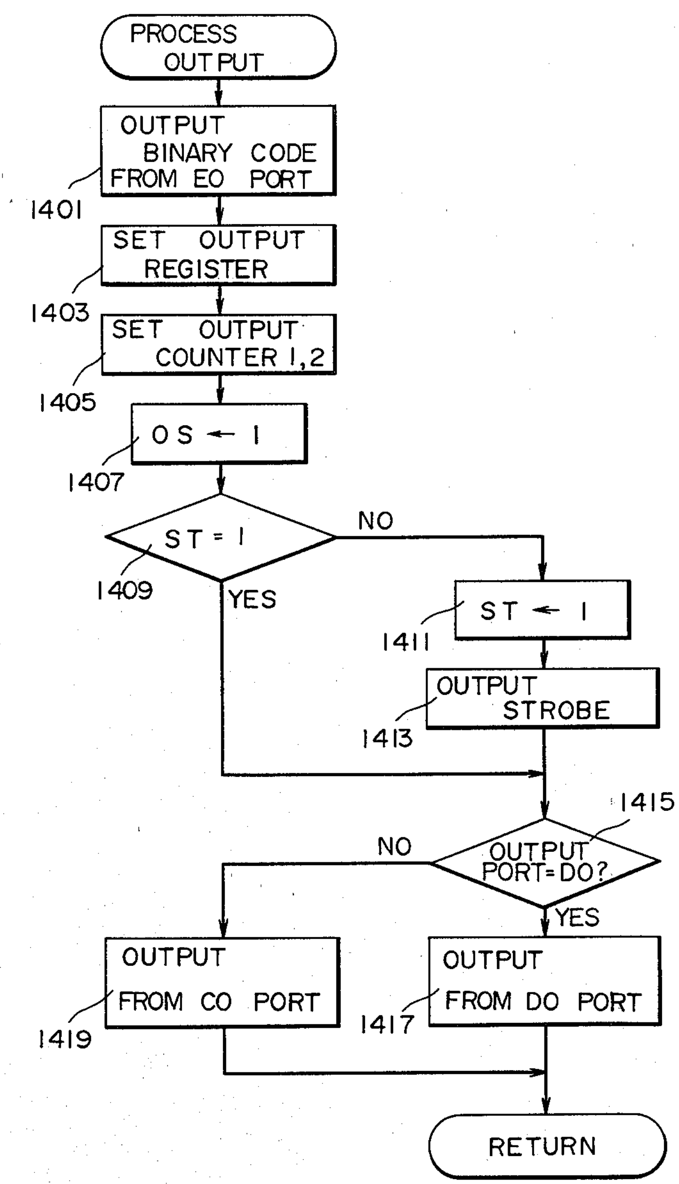
Figure 15:
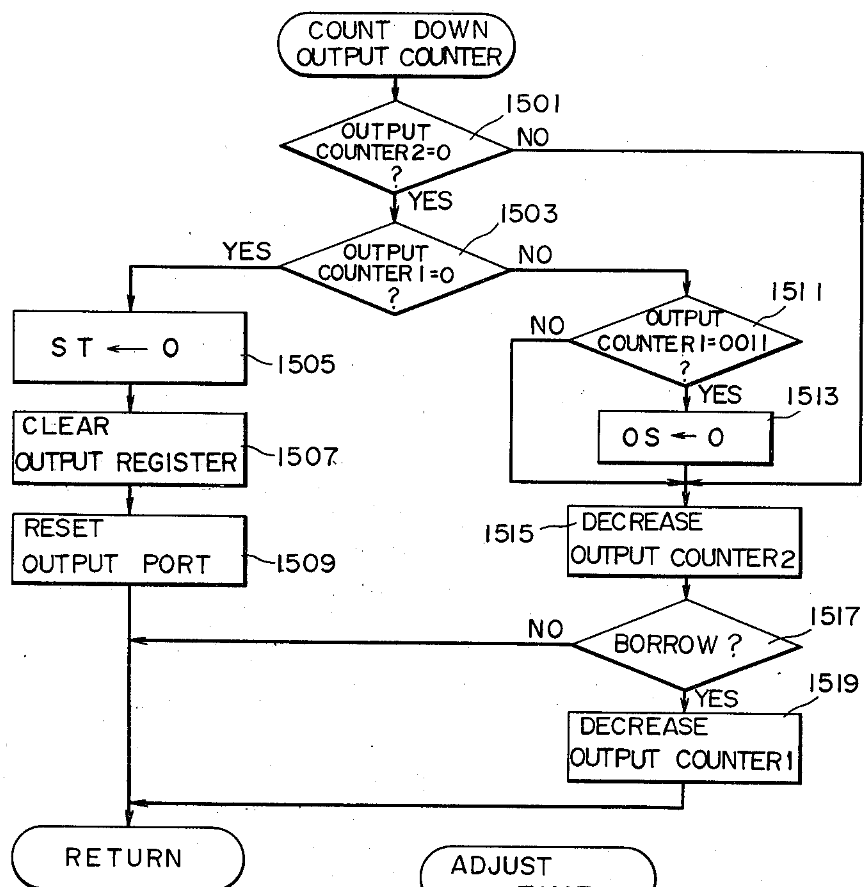
Figure 16:
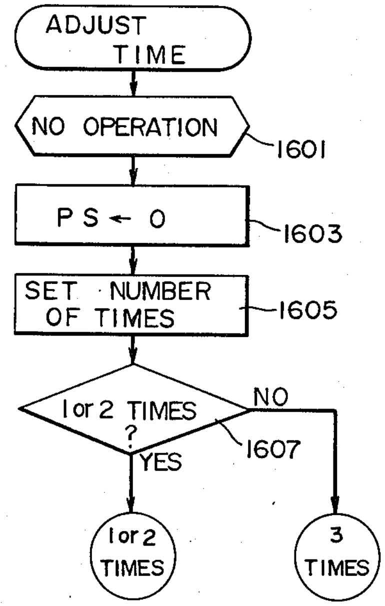

At the following step 723 the binary code of four bits obtained at the immediately previous step 721 is compared with that obtained by immediately previous signal processing and the output information is determined. More specifically, the operation at the step 723 is performed in accordance with the subroutine program shown in FIG. 13. Referring to FIG. 13, at the step 1301 it is determined whether the preceding output (binary code) coincides with the current output (binary code). This is performed through comparison of RAM (0,7), RAM (1,7) and RAM (2,7) with RAM (0,6), RAM (1,6) or RAM (2,6) in accordance with designation thereof. If and when the preceding result and the current result coincide with each other, then at the following step 1303 it is determined whether the current output information is "0000". If and when the output information is "0000", then at the following step 1305 it is determined whether the program status flag PS has been set. More specifically, at the step 1305 it is determined whether the output information "0000" is the information as the data representing the output channel or the information representing no output available. If and when the flag PS has been set, then at the following step 1307 it is determined whether the zero output flag ZF has been set. The fact that the zero output flag ZF has been set means that "0000" was obtained as an output two times consecutively. If not, then at the following step 1309 it is determined whether the output state flag OS has been set. If and when the flag OS has been set at that time, this means that the output data was obtained at the preceding operation as well, whereas if and when the flag OS has been reset, it is determined that the output data is obtained as an output for the first time. If and when it is determined at the preceding step 1301 that the preceding output data does not coincide with the current output data, then at the following step 1311 it is determined, as in the case of the step 1305, that the program status flag PS has been set. If the flag PS has been set, at the step 1307 the flag ZF is set at the step 1313, as in the case where the zero output flag ZF has not been set. If and when the flag PS has not been set, then the zero output flag ZF is reset at the following step 1315, as in the case where determination is so made at the step 1305.

Thus it is determined through the steps 723 and 725 that the same is of the new output data and, if the output data at that time is the new output data, then the program proceeds to the following step 727 and otherwise the program proceeds through the step 729 to the step 731.

First in the case where the current output information is the new one, at the step 727 the output processing is performed. More specifically, the operation at the step 727 is performed in accordance with the subroutine program shown in FIG. 14. At the step 1401 shown in FIG. 14 the output information loaded in the accumulator Acc at the steps 1243 to 1273 is outputted from the output port EO. At the same time at the step 1403 the same as the binary code obtained from the output port EO is stored in the output register. Then at the step 1405 a predetermined numerical value is set in the OUTPUT COUNTER 1 and 2. The setting of the OUTPUT COUNTER 1 and 2 at the step 1405 is performed by countdown processing at the step 729. For example, "0110" is set in the OUTPUT COUNTER 1 and "1111" is set in the OUTPUT COUNTER 2. Meanwhile, the countdown operation by the OUTPUT COUNTER 1 and 2 will be described subsequently. At the step 1407 the output state flag OS is set and at the following step 1409 it is determined whether the strobe flag ST has been set. If the strobe flag ST has not been set, at the step 1411 the flag ST is set and the strobe signal STROBE is outputted at the step 1413. The strobe signal STROBE is obtained by bringing the output ports CO10 and CO11 to the high level. At the following step 1415 it is determined whether the output channel being outputted at that time is the DO port. If the output channel is the DO port, then the output is obtained from any one of the output ports DO0 to DO7, whereas the output channel is not the DO port, then the output is obtained from any one of the output ports CO0 to CO7.

At the step 729 the countdown operation of the OUTPUT COUNTERS 1 and 2 previously set at the preceding step 1405 (FIG. 14) is performed. More specifically, at the step 729 the output from the output port is maintained for more than a predetermined time period at least more than two received data periods (one received data period is $8 \times TB$), during which time period all the received data is canceled, whereby malfunction occurring through simultaneous reception of the transmission data from a plurality of transmitters is prevented. More specifically, the operation at the step 729 is performed in accordance with the subroutine program shown in FIG. 15. At the steps 1501 and 1503 shown in FIG. 15 it is determined whether the output counters 2 and 1 are "0", respectively. If and when these two OUTPUT COUNTERS 1 and 2 are both "0", then at the following step 1505 the strobe flag ST is reset and at the following steps 1507 and 1509 the OUTPUT REGISTER is cleared and the output ports CO, DO and EO are all reset. If and when the OUTPUT COUNTER 2 is "0" and the OUTPUT COUNTER 1 is not "0", then at the following step 1511 it is determined whether the content in the OUTPUT COUNTER 1 is "0011". The reason is that the output state flag OS is reset at the step 1513 before the OUTPUT COUNTER 1 becomes "0". The purpose of resetting the flag OS before the OUTPUT COUNTER 1 becomes zero is to take into consideration the case where the same control (output) data has been supplied consecutively. When the flag OS is reset at the step 1513, then as in the case where the OUTPUT COUNTER 1 is not "0011" or the OUTPUT COUNTER 2 is not "0", the OUTPUT COUNTER 2 is decreased at the following step 1515. It is determined at the step 1517 whether a borrow has occurred in the output counter 2 as a result of the above described decreased. If such borrow has occurred, then at the following step 1519 the OUTPUT COUNTER 1 is decreased. More specifically, the operation at the steps 1511 to 1519 performs a decreasing or countdown operation through each passage of this loop when the OUTPUT COUNTERS 1 and 2 are not "0". The strobe flag ST is not reset until these OUTPUT COUNTERS 1 and 2 become "0". Accordingly, during a time period when the above described flag ST is set (for example, for more than a time period of four received data periods), the strobe signal STROBE is not outputted. Therefore, in the case where the transmission data from the transmitter is continuing, malfunction such as the received data being masked or the strobe signal STROBE being outputted under the influence of a noise and the like is effectively prevented.

After the step 727 or 729, at the following step 731 time adjustment is made. The time adjustment serves to prolong the units, i.e. the unit time periods in the receiver as compared with the units or the unit time periods in the transmitter, thereby to prevent the units in the receiver from becoming shorter than those in the transmitter by way of a time dependent fluctuation. The above described time adjustment is achieved by the subroutine program shown in FIG. 16. More specifically, at the step 1601 shown in FIG. 16 the command of "NO OPERATION" is outputted a proper number of times say fifteen times from the read only memory ROM (FIG. 5), whereby an idling state is maintained. Then after the idling time the program status flag PS is reset at the step 1603 and at the following step 1605 the number of times of signal processing is set. More specifically, in the embodiment shown the signal processing is performed in the receiver three times corresponding to one unit time period in the transmitter. At the step 1605 the number of times of signal processing is set in the accumulator Acc. Then at the following step 1607 it is determined whether the number of times is one time or two times or three times, by referring to the content in the accumulator Acc. Meanwhile, the operation at the step 1607 is the same as that in the step 735 shown in FIG. 7. Accordingly, if and when it is determined at the step 1607 or 735 that the number of times is the third, then at the following step 705 the accumulator Acc is set to "0". Conversely, if and when it is determined at the step 1607 or 735 that the number of times is the first or the second, then at the following step 707 the number of times set in the accumulator Acc at that time is stored in RAM (0,0), i.e. the register 1.

Meanwhile, in the foregoing the embodiment was described as adapted such that a plurality of frequency modulated transmission signals as transmitted from the transmitter and accordingly the receiver comprises a demodulating circuit of a superregenerative system. However, the manner of transmission of the data may be arbitrary. More specifically, it may be adapted such that a carrier signal may be normally transmitted and the carrier signal is modulated with a frequency signal as necessary. Furthermore, unless a wireless transmission is employed, i.e. if a wire transmission is employed, then such modulation or demodulation processing is not required and a frequency signal as such can be transmitted. Furthermore, the present invention can be achieved not only by using such electrical signal as described above but also by using other data transmission system such as light transmission, ultrasonic wave transmission or any other wave signal transmission.

Furthermore, in the foregoing the embodiment was described as adapted such that the transmission data comprises the address data and the control data, whereby the receiver address and the control manner or the output channels are designated; however, it is pointed out that the present invention can be effectively applied to a system wherein the transmission data comprises only either the address data or the control data. In the case where the transmission data comprises only the control data, the embodiment may be adapted such that only if and when at least two received data coincide with each other among a plurality of received data reproduced at a plurality of timings, the received data as coincided with each other are identified as correct received data. Furthermore, although the filters were used for frequency discrimination in the receiver, the frequency discriminating means may be implemented by frequency counters and other well known means.

Although the present invention has been described and illustrated in detail, it is clearly understood that the same is by way of illustration and example only and is not to be taken by way of limitation, the spirit and scope of the present invention being limited only by the terms of the appended claims.

TABLE

| S1 | S6 | OUTPUT |
|---|---|---|
| 1000 | 1000 | 0000 PS = 1 |
| 1000 | 0100 | 0001 |
| 1000 | 0010 | 0010 |
| 1000 | 0001 | 0011 |
| 0100 | 1000 | 0100 |
| 0100 | 0100 | 0101 |
| 0100 | 0010 | 0110 |
| 0100 | 0001 | 0111 |
| 0010 | 1000 | 1000 |
| 0010 | 0100 | 1001 |
| 0010 | 0010 | 1010 |
| 0010 | 0001 | 1011 |
| 0001 | 1000 | 1100 |
| 0001 | 0100 | 1101 |
| 0001 | 0010 | 1110 |
| 0001 | 0001 | 1111 |
| not 1000, 0100, 0010, nor 0001 | not 1000, 0100, 0010, nor 0001 | 0000 PS = 0 |

What is claimed is:

1. An asynchronous type multichannel signal processing system comprising:
   a transmitter including;
      transmission data generating means for generating data being transmitted,
      frequency signal generating means for generating a plurality of frequency signals,
      converting means responsive to said transmission data and said frequency signals for converting said transmission data into a transmission signal wherein one unit time period corresponding to one portion of said data being transmitted includes any one of said frequency signals and a group of a plurality of unit time periods constitute an information unit, and
      transmitting means for transmitting said transmission signal converted by said converting means to said receiver; and
   a receiver including;
      receiving means for receiving said transmission signal transmitted from said transmitter, and
      received data processing means for repetitively reading the received transmission signal obtained from said receiving means at a plurality of different timings during each said unit time period to produce a plurality of data readings; and
      means for determining that said received data is correct when said plurality of data readings which coincide are at least two but not greater than the number of said data readings.

2. An asynchronous type multichannel signal processing system in accordance with claim 1, wherein
   said received data identifying means comprises consecutive detecting means for detecting that said plurality of data readings which coincide, consecutively coincide with each other.

3. An asynchronous type multichannel signal processing system in accordance with claim 1, wherein said converting means comprises unit signal generating means for generating a unit signal representing said unit time period.

4. An asychronous type multichannel signal processing system in accordance with claim 3, wherein
   said transmitting means comprises modulating means for generating a modulated signal modulated with said frequency signal obtained from said frequency signal generating means.

5. An asynchronous type multichannel signal processing system in accordance with claim 4, wherein said modulating means further comprises:
   a carrier oscillator for providing a carrier wave, and switching means responsive to said frequency signal from said frequency signal outputting means for enabling/disabling said carrier oscillator, said receiving means further comprising superregenerative demodulating means for demodulating said modulated signal.

6. An asynchronous type multichannel signal processing system in accordance with claim 3, which further comprises clock signal source means for producing a clock signal, said unit signal generating means further including counter means responsive to said clock signal source means for counting said clock signal, and decoder means for decoding the output of said counter means.

7. An asynchronous type multichannel signal processing system in accordance with claim 3, wherein said transmission signal includes a signal-absent time period interposed between said information units.

8. An asynchronous type multichannel signal processing system in accordance with claim 7, wherein said converting means comprises signal-absent period setting means for preventing said frequency signal from being transmitted in a time period of at least one unit out of each information unit.

9. An asynchronous type multichannel signal processing system in accordance with claim 8, wherein said signal-absent period setting means is adapted to prevent said frequency signal from being outputted in the time period of a plurality of unit signals that are consecutive.

10. An asynchronous type multichannel signal processing system in accordance with claim 8, wherein said signal-absent period setting means is adapted to prevent said frequency signal from being outputted in the time period of a plurality of unit signals that are not consecutive.

11. An asynchronous type multichannel signal processing system comprising:

a transmitter including;

transmission data generating means for generating data being transmitted, frequency signal generating means for generating a plurality of frequency signals, converting means responsive to said transmission data and said frequency signals for converting said transmission data into a transmission signal wherein one unit time period corresponding to one portion of said data being transmitted includes any one of said frequency signals and a group of a plurality of unit time periods constitute an information unit, and transmitting means for transmitting said transmission signal converted by said converting means to said receiver; and a receiving including;

receiving means for receiving said transmission signal transmitted from said transmitter, and received data processing means for repetitively reading the received transmission signal obtained from said receiving means at a plurality of different timings during each said unit time period to produce a plurality of data readings for reproducing received data, said received data comprising at least address data, and said receiver includes self-address data generating means for generating address data unique to said receiver, said received data processing means further including;

address data comparing means for comparing the address data included in said plurality of data readings with said self-addressed data obtained from said self-address data generating means, said address data comparing means identifying said receiver as designated when the address defined is at least two of said data readings included in said plurality of data readings, but not more than the total number of address readings, coincides with said self-address data.

12. An asynchronous type multichannel signal processing system in accordance with claim 11, wherein said address data comparing means comprises consecutive detecting means for detecting that said plurality of data readings which coincide include address data which consecutively coincide with said self-address data.

13. An asynchronous type multichannel signal processing system in accordance with claim 1 or 11 wherein said transmission signal includes a signal-absent time period interposed between said information units.

14. An asynchronous type multichannel signal processing system in accordance with claim 1 or 11, wherein said transmission signal comprises an electric wave.

15. An asynchronous type multichannel signal processing system in accordance with claim 1 or 11, wherein said transmission signal comprises a light signal.

16. An asynchronous type multichannel signal processing system in accordance with claim 1 or 11, wherein said transmission signal comprises an ultrasonic wave signal.

* * * * *